US012599225B1

(12) United States Patent
Guo

(10) Patent No.: US 12,599,225 B1
(45) Date of Patent: Apr. 14, 2026

(54) MAKEUP BRUSH AND SPONGE CLEANING MACHINE

(71) Applicant: Laisong Tang, Dongguan (CN)

(72) Inventor: Weihan Guo, Dongguan City (CN)

(*) Notice: Subject to any disclaimer, the term of this patent is extended or adjusted under 35 U.S.C. 154(b) by 0 days.

(21) Appl. No.: 19/394,180

(22) Filed: Nov. 19, 2025

(51) Int. Cl.

| | |
|---|---|
| ***A46B 17/06*** | (2006.01) |
| ***B08B 3/04*** | (2006.01) |
| ***B08B 3/10*** | (2006.01) |

(52) U.S. Cl.
CPC .............. *A46B 17/06* (2013.01); *B08B 3/041* (2013.01); *B08B 3/102* (2013.01); *A46B 2200/1046* (2013.01)

(58) Field of Classification Search
USPC ........................................................ 134/58 R
See application file for complete search history.

(56) References Cited

U.S. PATENT DOCUMENTS

| | | | | |
|---|---|---|---|---|
| 9,380,860 B1 * | 7/2016 | Taylor | .................... | A46B 17/06 |
| 10,888,156 B2 * | 1/2021 | Munoz | ...................... | F26B 3/04 |
| 11,330,899 B2 * | 5/2022 | Premananda | ............. | B08B 3/08 |
| 2019/0208900 A1 * | 7/2019 | Childs | .................... | A46B 17/06 |

* cited by examiner

*Primary Examiner* — Cristi J Tate-Sims

(57) ABSTRACT

The present invention discloses a makeup brush and sponge cleaning machine. The machine comprises a housing, a top cover, a mounting seat, a servo motor, an upper rotating insertion cylinder, a lower rotating insertion cylinder, and a controller. A partition plate is arranged inside the housing to divide the interior of the housing into a left chamber and a right chamber. A plurality of ribs are uniformly provided at the bottom of the right chamber. The top cover is detachably connected to the mounting seat, and the lower part of the mounting seat is detachably mounted on the housing. The machine further comprises a rotating dial. An insertion rod is provided on the upper end of the rotating dial, and the insertion rod forms an insertion connection with an insertion port.

8 Claims, 11 Drawing Sheets

MAKEUP BRUSH AND SPONGE CLEANING MACHINE

FIELD OF THE APPLICATION

The present invention relates to the technical field of makeup brush and sponge cleaning machines, and specifically to a makeup brush and sponge cleaning machine.

BACKGROUND

In the field of makeup and daily life, makeup brushes and sponges are commonly used tools, whose cleanliness directly affects the application effect and usage safety. For example, if a makeup brush is not thoroughly cleaned, residual cosmetic components can breed bacteria, which not only affects the uniformity of the makeup but may also irritate the skin and cause allergies. For painting brushes, residual paint can solidify and form clumps, causing the bristles to become stiff and reducing the smoothness of subsequent painting applications. Makeup sponges, as core makeup application tools in the beauty industry, can easily harbor residual cosmetic products inside. If not cleaned properly, they similarly pose hygiene risks.

Currently, the primary cleaning method for makeup brushes and sponges in the industry is manual washing, which has many drawbacks: First, the cleaning efficiency is low, especially in scenarios requiring batch cleaning of tools, such as in beauty institutions or painting factories, where manual washing consumes significant manpower and time. Second, the cleaning effectiveness is poor; manual rubbing struggles to allow cleaning agents to penetrate deep into the bristles or the interior of the sponge, making it difficult to completely remove residual dirt. Furthermore, repeated rubbing can easily cause the bristles of makeup brushes to tangle and deform, disrupting the orderly arrangement of the bristles and reducing the tool's service life. Third, the functionality is singular; after manual washing, separate spin-drying or air-drying is required. Improper operation during spin-drying can further damage the bristles, while air-drying takes a long time, affecting the turnover and reuse of the tools.

To address the shortcomings of manual cleaning, a small number of simple cleaning devices have appeared on the market, but they still have obvious defects: Some devices are designed only for makeup brushes and cannot adapt to the cleaning needs of flat beauty tools like sponges, resulting in poor versatility. Some devices attempt to accommodate multiple types of tools but lack optimized cleaning structures tailored for them. For instance, they lack effective separation mechanisms during brush cleaning, leading to bristle tangling, and lack specialized agitation structures for sponge cleaning, resulting in insufficient cleaning. Furthermore, most devices do not integrate washing and spin-drying functions, requiring additional spin-drying equipment, which increases cost and operational complexity. Additionally, these devices often lack sufficient operational stability and are prone to shaking or offset during high-speed rotation.

Based on the deficiencies of the aforementioned prior art, it is necessary to design a makeup brush and sponge cleaning machine.

SUMMARY

The technical problem to be solved by the present invention is to overcome the above-mentioned technical deficiencies and provide a makeup brush and sponge cleaning machine.

To solve the above technical problem, the technical solution provided by the present invention is a makeup brush and sponge cleaning machine, comprising: a housing, a top cover, a mounting seat, a servo motor, an upper rotating insertion cylinder, a lower rotating insertion cylinder, and a controller; a partition plate is arranged in the middle of the housing to divide the interior of the housing into a left chamber and a right chamber; a plurality of ribs are uniformly provided at the bottom of the right chamber; the top cover is detachably connected to the upper end of the mounting seat, and the lower part of the mounting seat is detachably mounted above the housing; a servo motor is provided on one side of the mounting seat, and a gear is provided on the upper end of the servo motor; a mounting base is provided on another side of the mounting seat, the mounting base being located directly above one of the chambers; a bearing is installed inside the mounting base; the upper rotating insertion cylinder is arranged within the bearing and its lower end extends downward below the bearing; the lower end of the upper rotating insertion cylinder extending below the bearing is sleeved with the lower rotating insertion cylinder; an insertion disk is detachably connected to each of the upper end of the upper rotating insertion cylinder and the lower end of the lower rotating insertion cylinder; a plurality of insertion ports for inserting makeup brushes are provided on the insertion disk; a tooth is provided on the circumference of the upper rotating insertion cylinder; the gear and the tooth are connected and cooperate via a toothed belt, whereby rotation of the servo motor drives the upper rotating insertion cylinder and the lower rotating insertion cylinder to rotate; the controller is provided at the inner top of the top cover; the controller is electrically connected to the servo motor;

The machine further comprises a rotating dial; an insertion rod is provided on the upper end of the rotating dial, and the insertion rod and the insertion ports form an insertion fit.

As an improvement, a circular hole cooperating with the upper rotating insertion cylinder is provided on the upper end of the top cover, and an outer cover is disposed within the circular hole.

As an improvement, a plurality of upper connecting columns are provided below the insertion disk located on the upper rotating insertion cylinder; a plurality of lower connecting columns are provided above the insertion disk located on the lower rotating insertion cylinder; an upper end of each lower connecting column is inserted into a corresponding upper connecting column and is fixedly connected by a screw.

As an improvement, a pressure plate is provided above the mounting base, the pressure plate is located above the bearing for limiting the bearing, and the pressure plate is fixedly connected to the mounting base by screws.

As an improvement, a switch electrically connected to the controller is provided on one side of the top cover.

As an improvement, a battery is provided on the mounting seat, and the battery is electrically connected to the controller.

As an improvement, a base is detachably connected to the bottom of the housing, and counterweights are disposed inside the base directly below the left chamber and the right chamber.

As an improvement, a transparent viewing window is provided on a side wall of the right chamber of the housing for observing a water level.

Advantages of the present invention compared to the prior art are as follows:

1. The insertion disks are detachably connected to the upper end of the upper rotating insertion cylinder and the lower end of the lower rotating insertion cylinder, respectively. The insertion disks are provided with a plurality of insertion ports for inserting makeup brushes. This allows the handles of the makeup brushes to be inserted into the insertion ports, thereby securing them to the insertion disks. Consequently, during the cleaning process when the servo motor drives the upper and lower rotating insertion cylinders to rotate, these insertion disks maintain a certain distance between the brushes, preventing the bristles from tangling or deforming during cleaning, thus preserving the performance of the brush tools. Simultaneously, the rotation of the brushes helps comb the bristles, allowing the cleaning agent to penetrate deeper into the bristles and improving the cleaning effectiveness.

2. The partition plate arranged in the middle of the housing divides the interior into a left chamber and a right chamber. The bottom of the right chamber is uniformly provided with a plurality of ribs. When cleaning the brushes, the end of the top cover equipped with the upper and lower rotating insertion cylinders can be placed over the right chamber, positioning the brushes inside it. On one hand, driving the brushes to rotate at high speed during cleaning enables the cleaning agent to penetrate deep into the bristles and remove residual dirt. On the other hand, the ribs enhance the washing effect. When drying is required, the same end of the top cover is placed over the left chamber, positioning the brushes inside it. The servo motor drives the brushes to rotate, spinning off water from them, enabling quick and effective spin-drying of the brush tools.

3. The machine is equipped with a rotating dial. The rotating dial engages with the insertion ports via the insertion rod. This allows makeup sponges to be placed inside the left chamber. The servo motor then drives the upper rotating insertion cylinder, lower rotating insertion cylinder, and the rotating dial to rotate. The rotating dial agitates the water, thereby cleaning the makeup sponges.

4. The makeup brush and sponge cleaning machine adopts a modular design, allowing various components to be easily disassembled and replaced. This not only facilitates equipment maintenance and upkeep but also enables flexible configuration and upgrading of the device according to different cleaning needs.

BRIEF DESCRIPTION OF THE DRAWINGS

As shown in FIG. 1-11:

1. Housing, 2. Top Cover, 3. Mounting Seat, 4. Servo Motor, 5. Upper Rotating Insertion Cylinder, 6. Lower Rotating Insertion Cylinder, 7. Controller, 8. Partition Plate, 9. Left Chamber, 10. Right Chamber, 11. Rib, 12. Gear, 13. Mounting Base, 14. Bearing, 15. Insertion Disk, 16. Insertion Port, 17. Tooth, 18. Rotating Dial, 19. Insertion Rod, 20. Circular Hole, 21. Upper Connecting Column, 22. Lower Connecting Column, 23. Pressure Plate, 24. Switch, 25. Battery, 26. Base, 27. Counterweight, 28. Viewing Window, 29. Outer Cover While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The present invention will be further described in detail below with reference to the accompanying drawings.

Figure 1:
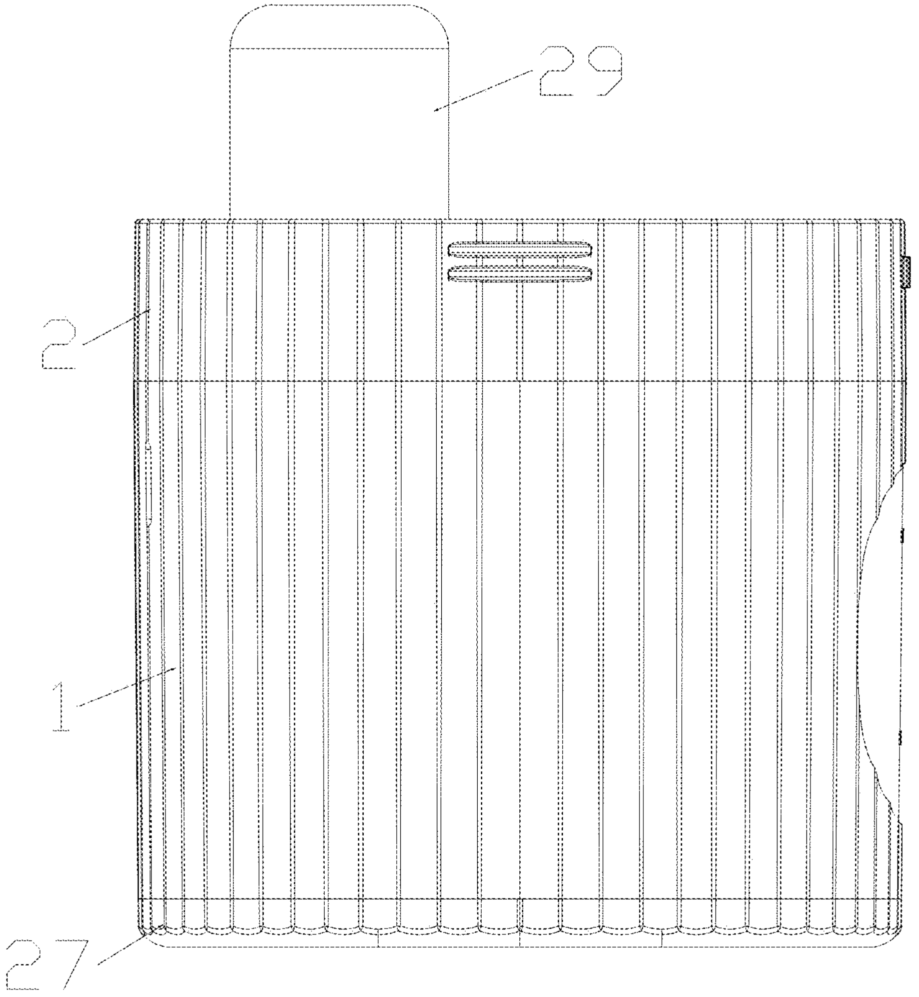
FIG. 1 is a front view of the makeup brush and sponge cleaning machine according to the present invention.
Figure 2:
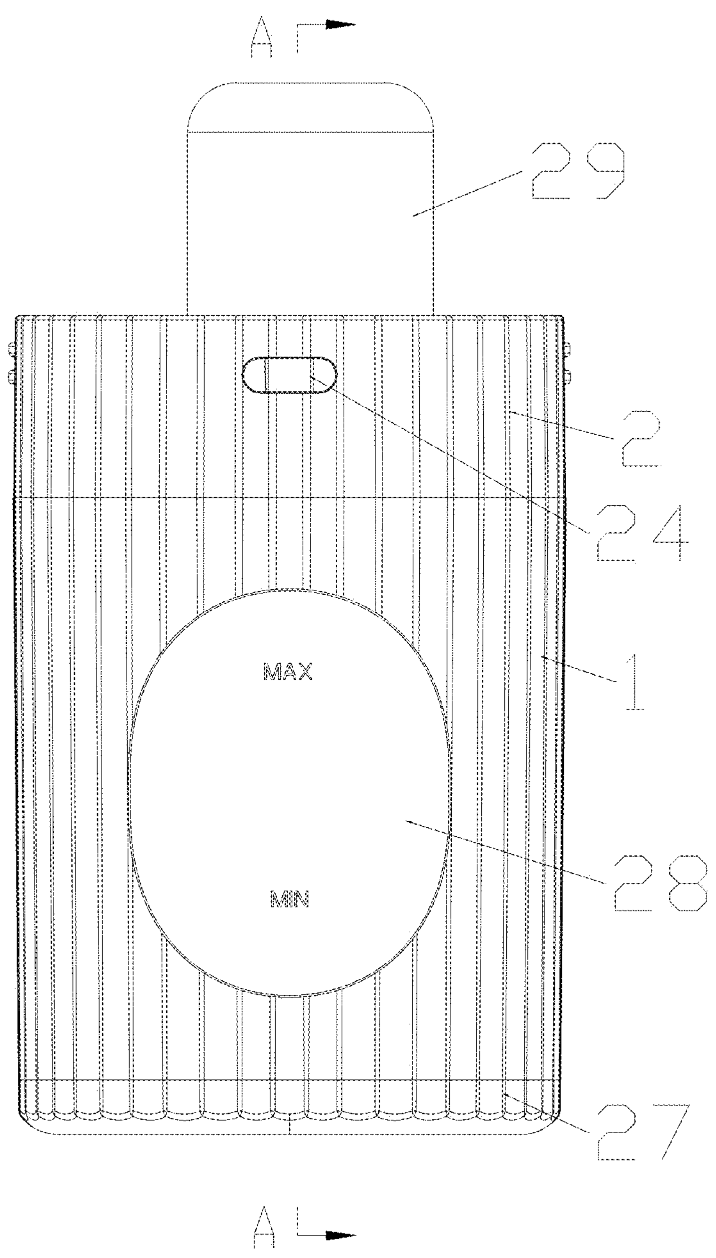
FIG. 2 is a right-side view of the makeup brush and sponge cleaning machine according to the present invention.
Figure 3:
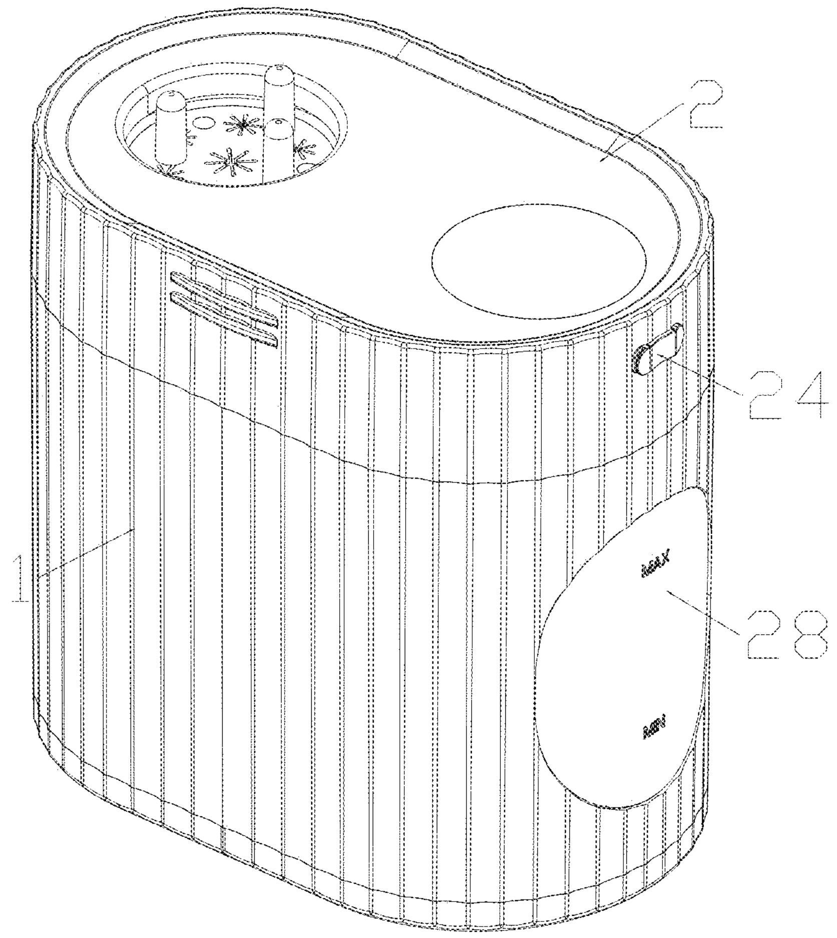
FIG. 3 is a schematic perspective view from above of the makeup brush and sponge cleaning machine according to the present invention.
Figure 4:
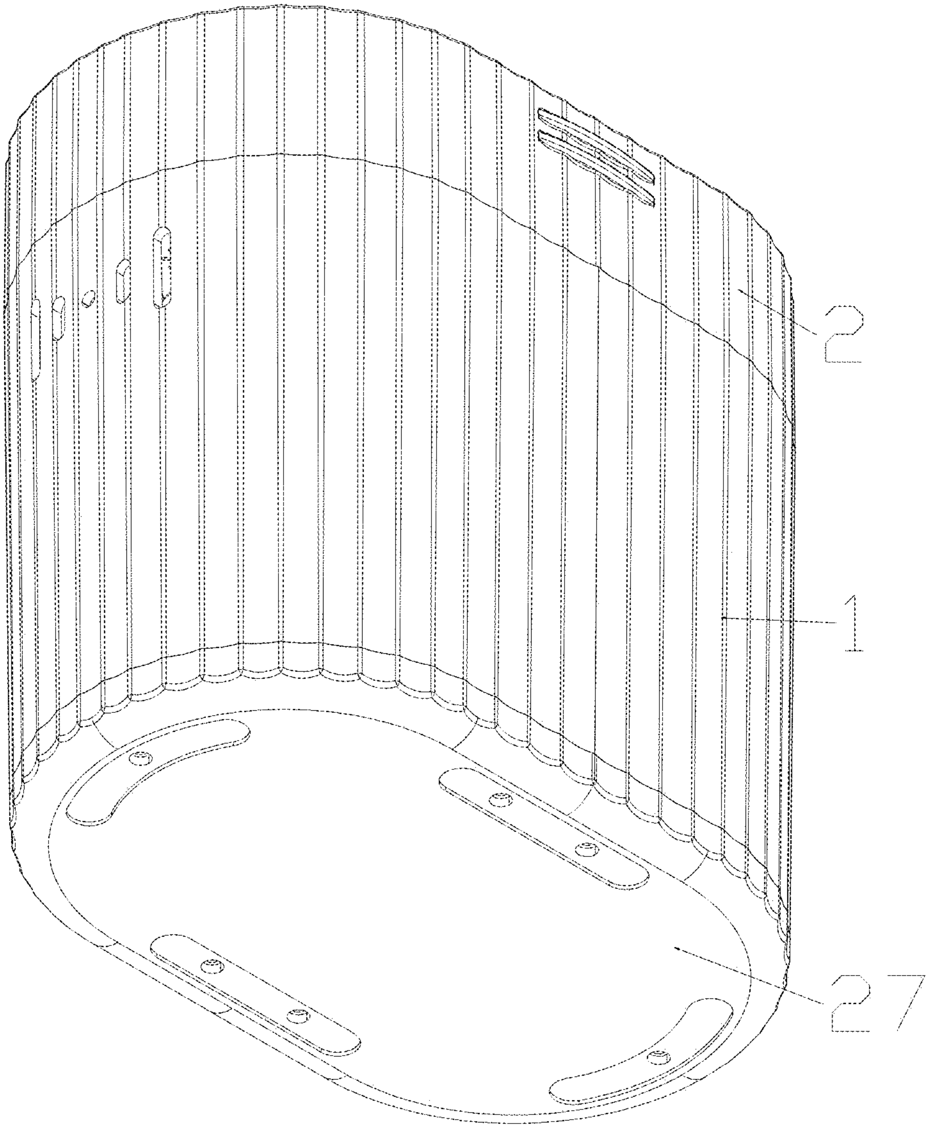
FIG. 4 is a schematic perspective view from below of the makeup brush and sponge cleaning machine according to the present invention.
Figure 5:
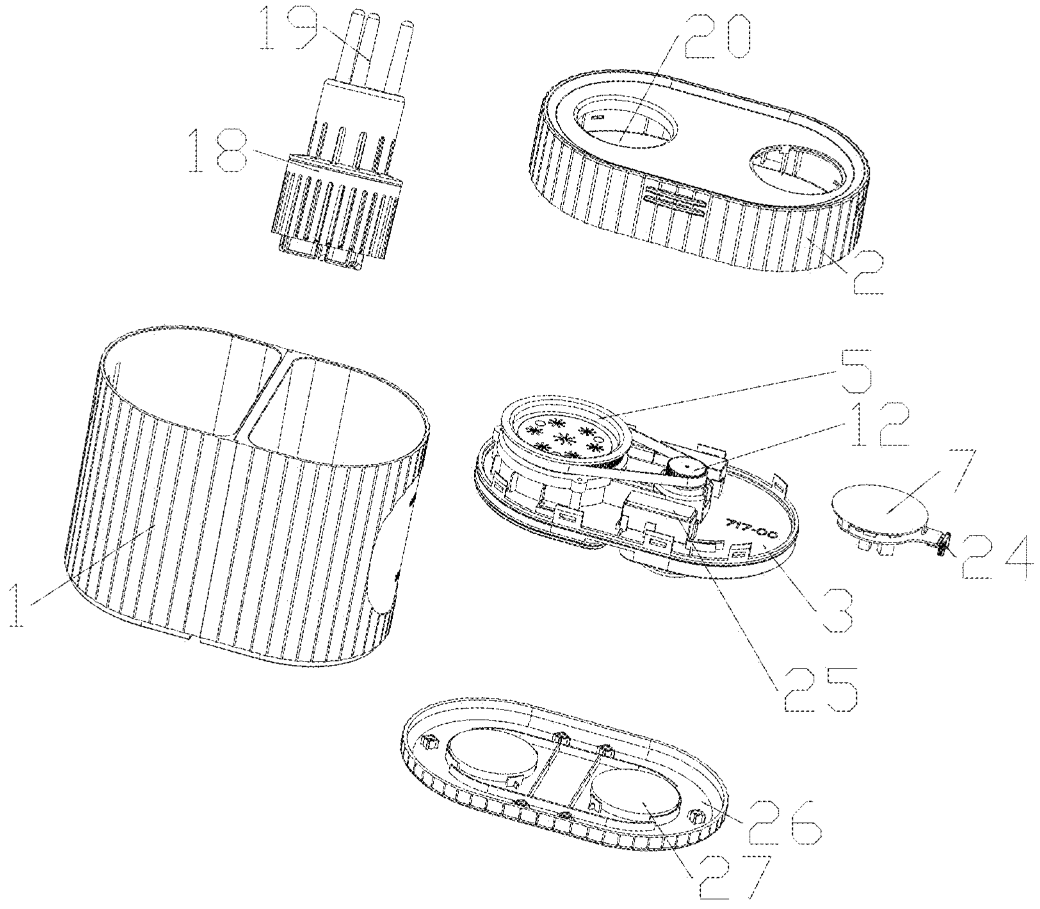
FIG. 5 is a schematic structural view of the makeup brush and sponge cleaning machine according to the present invention in a disassembled state.
Figure 6:
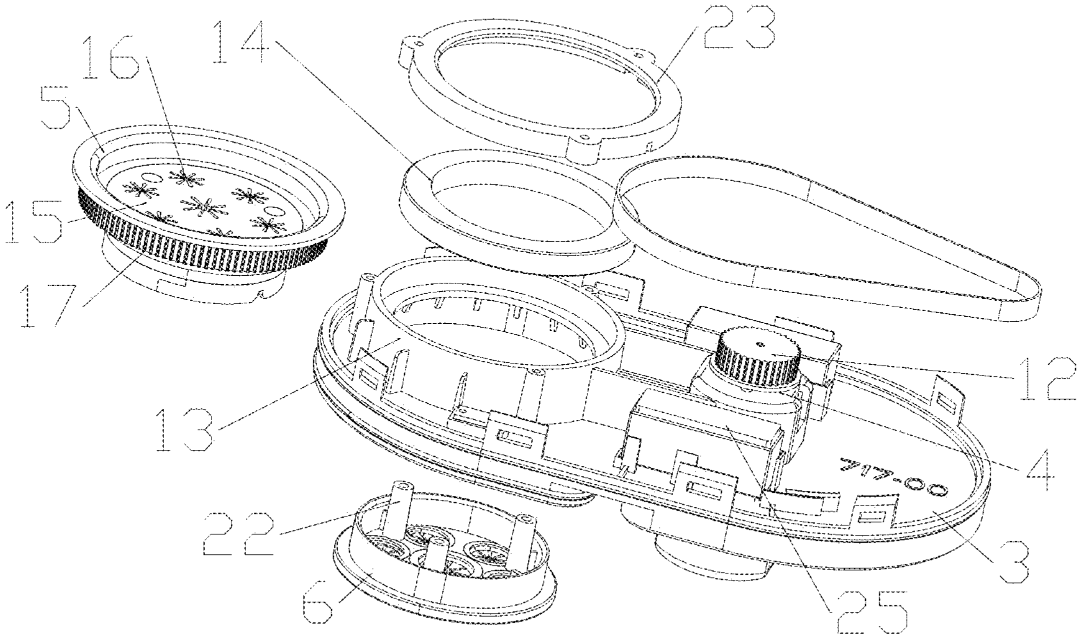
FIG. 6 is a schematic structural view of the mounting seat, upper rotating insertion cylinder, and lower rotating insertion cylinder of the makeup brush and sponge cleaning machine according to the present invention in a disassembled state.
Figure 7:
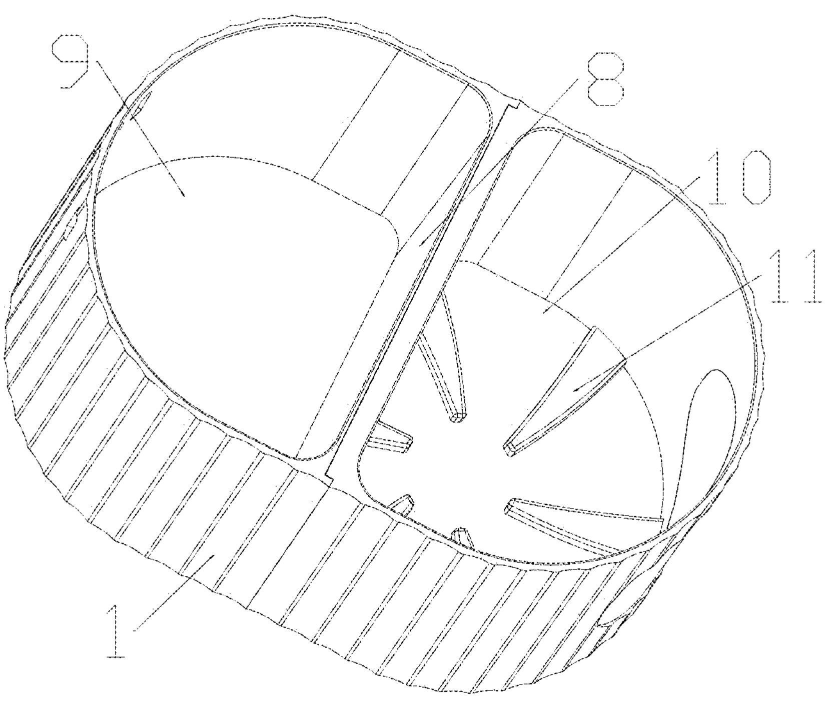
FIG. 7 is a schematic view of the internal structure of the housing of the makeup brush and sponge cleaning machine according to the present invention.
Figure 8:
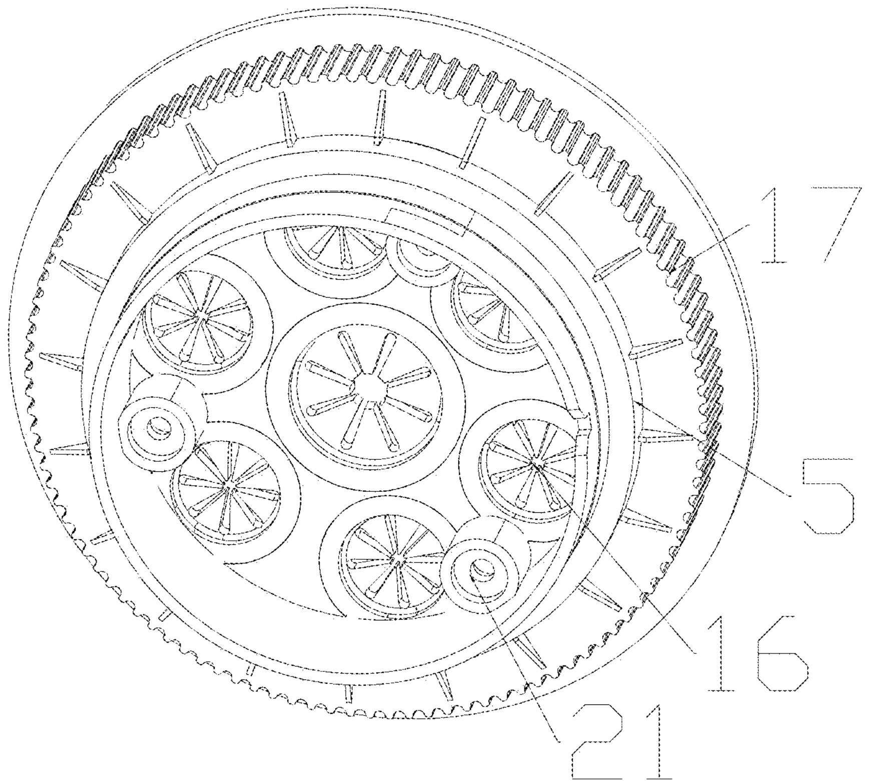
FIG. 8 is a schematic bottom view of the upper rotating insertion cylinder of the makeup brush and sponge cleaning machine according to the present invention.
Figure 9:
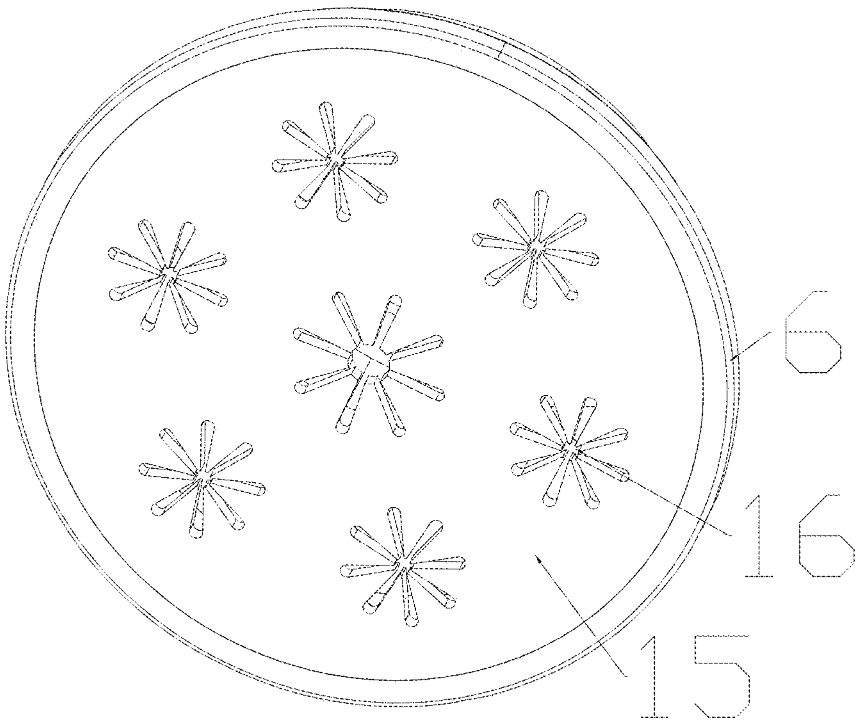
FIG. 9 is a schematic bottom view of the lower rotating insertion cylinder of the makeup brush and sponge cleaning machine according to the present invention.
Figure 10:
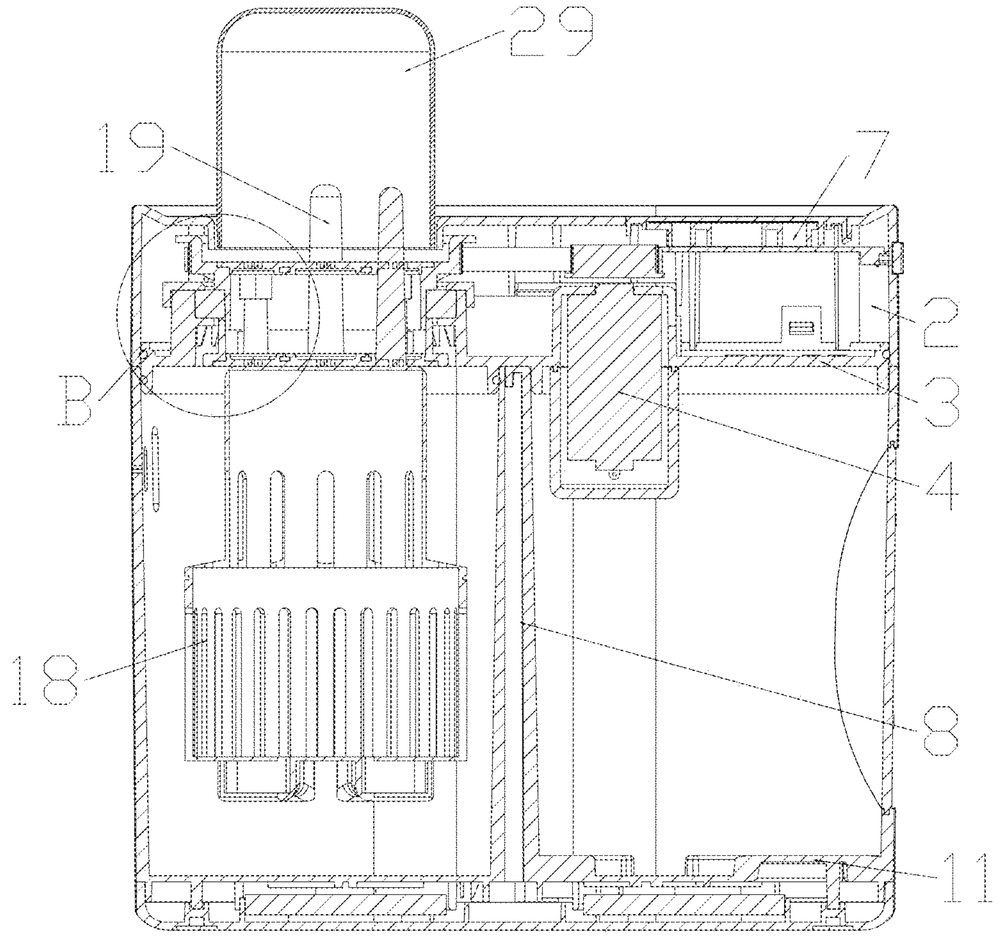
FIG. 10 is a cross-sectional view taken at line A-A in FIG. 2.
Figure 11:
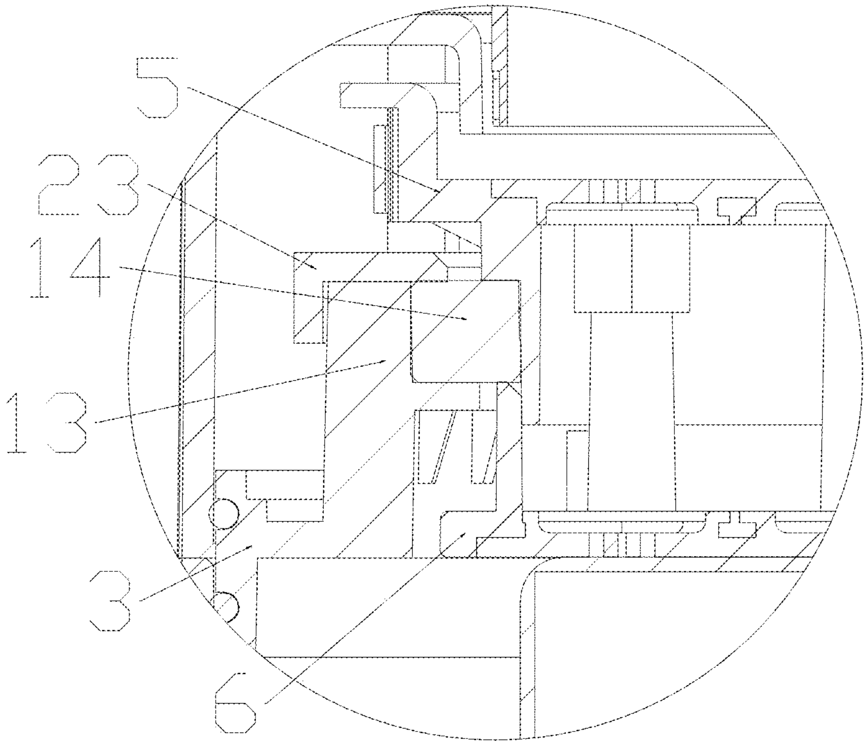
FIG. 11 is a partial enlarged view of section B in FIG. 10.

With reference to FIGS. 1-11, a makeup brush and sponge cleaning machine comprises a housing 1, a top cover 2, a mounting seat 3, a servo motor 4, an upper rotating insertion cylinder 5, a lower rotating insertion cylinder 6, and a controller 7. A partition plate 8 is arranged in the middle of the housing 1 to divide the interior of the housing 1 into a left chamber 9 and a right chamber 10. A plurality of ribs 11 are uniformly provided at the bottom of the right chamber 10; these ribs enhance water flow turbulence during the cleaning process, improving the washing effect. The inner wall of the left chamber 9 is a smooth surface. The top cover 2 is detachably connected to the upper end of the mounting seat 3. The lower part of the mounting seat 3 is detachably mounted above the housing 1, facilitating user disassembly and assembly, and also facilitating the swapping of the left-right installation direction of the top cover 2 and the mounting seat 3. The outer periphery of the lower part of the mounting seat 3 is provided with a sealing ring; installation onto the housing 1 achieves a sealing effect, preventing water from overflowing during cleaning. The servo motor 4 is arranged on one side of the mounting seat 3, and a gear 12 is provided on the upper end of the servo motor 4. A mounting base 13 is provided on another side of the mounting seat 3, and the mounting base 13 is located directly above one of the chambers.

In one embodiment, the right chamber 10 serves as the brush cleaning and spin-drying chamber. When brush cleaning is required, the brush handles can be inserted into the insertion ports 16, and then the upper rotating insertion cylinder 5 and lower rotating insertion cylinder 6 of the top cover 2 are positioned above the right chamber 10. The servo motor 4 drives the brushes to rotate, thereby cleaning them.

In another embodiment, the left chamber 9 serves as the sponge cleaning chamber. When sponge cleaning is required, the sponge can be placed inside the left chamber 9, and the rotating dial 18 is inserted into a central insertion port 16 via its insertion rod 19. Then, the upper rotating insertion cylinder 5 and lower rotating insertion cylinder 6 of the top cover 2 are positioned above the left chamber 9. The servo motor 4 drives the rotating dial 18 to rotate, which agitates the water, thereby cleaning the sponge.

A bearing 14 is installed inside the mounting base 13. The upper rotating insertion cylinder 5 is disposed within the bearing 14, and its lower end extends downward below the bearing 14. The lower end of the upper rotating insertion cylinder 5 extending below the bearing 14 is sleeved with the lower rotating insertion cylinder 6. Insertion disks 15 are detachably connected to the upper end of the upper rotating insertion cylinder 5 and the lower end of the lower rotating insertion cylinder 6, respectively. The insertion disks 15 are made of silicone material, providing good elasticity to avoid damaging the brush handles during clamping. A plurality of insertion ports 16 for inserting makeup brushes are provided on the insertion disks 15. The inner diameters of the insertion ports 16 are designed according to common brush handle sizes in three specifications: 8 mm, 10 mm, and 12 mm, uniformly distributed on the insertion disks 15, which can adapt to brush handles of different sizes; other sizes can also be configured. A tooth 17 is provided on the circumference of the upper rotating insertion cylinder 5. The gear 12 and the tooth are connected and cooperate via a toothed belt, whereby rotation of the servo motor 4 drives the upper rotating insertion cylinder 5 and the lower rotating insertion cylinder 6 to rotate. The controller 7 is provided at the inner top of the top cover 2. The controller 7 is electrically connected to the servo motor 4 and is used to control the motor's start/stop and rotational speed.

The machine further comprises a rotating dial 18. An insertion rod 19 is provided on the upper end of the rotating dial 18, and the insertion rod 19 and the insertion ports 16 form an insertion fit, thereby allowing the rotating dial 18 to be installed on the upper rotating insertion cylinder 5 and the lower rotating insertion cylinder 6. The rotating dial 18 can be detached and opened for placing makeup sponges and is used for spin-drying the sponges.

A plurality of upper connecting columns 21 are provided below the insertion disk 15 located on the upper rotating insertion cylinder 5. A plurality of lower connecting columns 22 are provided above the insertion disk 15 located on the lower rotating insertion cylinder 6. An upper end of each lower connecting column 22 is inserted into a corresponding upper connecting column 21 and is fixedly connected by a screw.

A circular hole 20 cooperating with the upper rotating insertion cylinder 5 is provided on the upper end of the top cover 2, allowing the upper end of the insertion rod 19 to extend upward through the top cover 2, thus enabling adjustment of the height of the rotating dial 18. An outer cover 29 is disposed within the circular hole for protection.

A pressure plate 23 is provided above the mounting base 13. The pressure plate 23 is located above the bearing 14 for limiting the bearing 14, and the pressure plate 23 is fixedly connected to the mounting base 13 by screws.

A switch 24 electrically connected to the controller 7 is provided on one side of the top cover 2. The switch 24 is a switch with an anti-misoperation protection function, employing operation methods such as press-to-trigger or a combination of pressing and rotating, or it is equipped with a switch locking mechanism. The cleaning machine can only be turned on or off after performing a specific operation, effectively preventing accidental start/stop of the device due to inadvertent contact with the switch.

A battery 25 is provided on the mounting seat 3. The battery 25 is electrically connected to the controller 7, providing power for the entire device and enabling cordless operation. The battery 25 is also equipped with a USB charging interface for convenient charging and reuse.

A base 26 is detachably connected to the bottom of the housing 1. Counterweights 27 are disposed inside the base 26 directly below the left chamber 9 and the right chamber 10 to increase the stability of the device and prevent shaking during high-speed rotation.

A transparent viewing window 28 is provided on a side wall of the right chamber 10 of the housing 1 for real-time observation of the water level and cleaning status inside the chamber. A plurality of ventilation holes are provided on the inner wall of the left chamber 9, which facilitates air convection when spin-drying is performed in the left chamber 9.

During specific implementation of the present invention:

Embodiment 1: Makeup Brush Cleaning Process

1. Detach the top cover 2 and the mounting seat 3 from the housing 1. Insert the handles of the makeup brushes to be cleaned into the corresponding insertion ports 16 on the insertion disks 15. Select the insertion port size that matches the brush size; the silicone insertion ports 16 clamp the brush handles through elastic deformation.

2. Observe through the transparent viewing window 28, add clean water and a special cleanser for makeup tools into the right chamber 10 until the water level reaches 2-3 cm above the brush bristles.

3. Close the top cover 2 and mounting seat 3, ensuring the upper rotating insertion cylinder 5 and lower rotating insertion cylinder 6 are positioned above the right chamber 10, with the brushes located inside the right chamber 10. Press the switch 24; the controller 7 activates the servo motor 4, which drives the upper rotating insertion cylinder 5 and lower rotating insertion cylinder 6 to rotate via the gear 12 and the toothed belt.

4. The brushes rotate synchronously with the insertion cylinders, allowing the bristles to fully extend in the water flow. The ribs 11 at the bottom of the right chamber 10 enhance water flow turbulence, enabling the cleanser to penetrate deep into the bristles and remove residual cosmetics.

5. After cleaning is complete, the controller 7 stops the servo motor 4. Remove the top cover 2 and mounting seat 3 from the housing 1, pour out the wastewater, thus completing the brush cleaning process.

Makeup Brush Spin-Drying Process

1. After brush cleaning is complete, drain the wastewater. Keep the brushes installed in their original state. Then, swap the installation direction of the top cover 2 so that the end with the upper rotating insertion cylinder 5 and lower rotating insertion cylinder 6 is positioned above the left chamber 9, placing the brushes inside the left chamber 9.

2. Press and hold the switch 24 for 3 seconds; the controller 7 commands the servo motor 4 to enter high-speed mode.

3. The brushes rotate at high speed, and water on the bristles is flung off by centrifugal force.

4. After spin-drying, the controller 7 stops the servo motor 4. Detach the top cover 2 and mounting seat 3, and remove the brushes to complete the spin-drying process.

Embodiment 2: Makeup Sponge Cleaning Process

1. Detach the top cover 2 and the mounting seat 3 from the housing 1. Install the rotating dial 18 by inserting its insertion rod 19 into a central insertion port 16 on the insertion disk 15 of the upper rotating insertion cylinder 5 or the lower rotating insertion cylinder 6.

2. Add clean water and cleaning agent into the left chamber 9, and place the makeup sponge(s) to be cleaned inside. Install the mounting seat 3 onto the housing 1, ensuring the rotating dial 18 extends into the water within the left chamber 9 and makes contact with the sponge(s).

3. Close the top cover 2 and press the switch 24. The controller 7 activates the servo motor 4, which drives the upper rotating insertion cylinder 5 and the rotating dial 18 to rotate.

4. The rotating dial 18 causes the water in the left chamber 9 to form a vortex. The water flow impacts the surface of the sponge(s) and penetrates into its interior, removing residual cosmetics.

5. After cleaning is complete, the servo motor 4 stops. Drain the wastewater, remove the sponge(s), thus completing the sponge cleaning process.

Makeup Sponge Spin-Drying Process:

The user places the makeup sponge into the rotating dial 18, which is installed via the insertion rod 19 into an insertion port 16. The user then closes the rotating dial 18, securing the sponge inside. Start the servo motor 4 to drive the rotating dial 18 to rotate, thereby spin-drying the sponge.

Additional Remarks:

1. The insertion disks 15, upper rotating insertion cylinder 5, and lower rotating insertion cylinder 6 can be detached for cleaning.

2. In future product updates, drying fans could be added to the left chamber 9 and right chamber 10 to improve drying efficiency.

3. In future product updates, an automatic water exchange device could be incorporated. This would involve draining the wastewater after cleaning the makeup brushes, adding clean water for rinsing, and subsequently initiating a drying cycle after the rinsing is complete.

In the description of the embodiments of the present invention, it is to be noted that:

Terms indicating orientation or positional relationships, such as "center," "upper," "lower," "left," "right," "vertical," "horizontal," "inner," "outer," etc., are based on the orientation or positional relationships shown in the accompanying drawings, or the conventional placement orientation when the product of the invention is in use. These terms are used only to facilitate the description of the present invention and simplify the description, and are not intended to indicate or imply that the referred apparatus or elements must have a specific orientation or be constructed and operated in a specific orientation. Therefore, they should not be construed as limiting the present invention.

Furthermore, terms such as "first," "second," "third," etc., are used solely for distinguishing descriptions and should not be construed as indicating or implying relative importance.

Additionally, terms such as "horizontal," "vertical," "suspended," etc., do not require the components to be absolutely horizontal or suspended but allow for slight inclination. For example, "horizontal" merely indicates that its direction is more horizontal relative to "vertical," and does not mean the structure must be completely level; it can be slightly inclined.

In the description of the embodiments of the present invention, "a plurality of" means at least two.

In the description of the embodiments of the present invention, it is further to be noted that, unless otherwise explicitly specified and defined, terms such as "set," "install," "connected," and "link" should be interpreted broadly. For example, a connection can be a fixed connection, a detachable connection, or an integral connection; it can be a mechanical connection, an electrical connection, or a direct connection, or it can be an indirect connection through an intermediary medium, or the internal communication between two elements. Those of ordinary skill in the art can understand the specific meanings of these terms in the present invention based on the specific circumstances.

The present invention and its embodiments have been described above. This description is not limiting, and what is shown in the drawings is only one embodiment of the present invention; the actual structure is not limited thereto. In summary, if those of ordinary skill in the art are inspired by the present invention and, without departing from the creative purpose of the present invention, design similar structural approaches and embodiments without creative effort, they shall all fall within the protection scope of the present invention.

The invention claimed is:

1. A makeup brush and sponge cleaning machine, comprising a housing, a top cover, a mounting seat, a servo motor, an upper rotating insertion cylinder, a lower rotating insertion cylinder, and a controller; a partition plate is disposed inside the housing to divide the interior of the housing into a left chamber and a right chamber; a plurality of ribs are uniformly provided at a bottom of the right chamber; the top cover is detachably connected to an upper end of the mounting seat, and a lower part of the mounting seat is detachably mounted above the housing; the servo motor is arranged on one side of the mounting seat, and a gear is provided on an upper end of the servo motor; a mounting base is arranged on another side of the mounting seat, wherein the mounting base is located directly above one of the chambers; a bearing is installed inside the mounting base; the upper rotating insertion cylinder is disposed within the bearing and a lower end thereof extends downward below the bearing; the lower end of the upper rotating insertion cylinder extending below the bearing is sleeved with the lower rotating insertion cylinder; an insertion disk is detachably connected to each of an upper end of the upper rotating insertion cylinder and a lower end of the lower rotating insertion cylinder; a plurality of insertion ports for inserting makeup brushes are provided on the insertion disk; a tooth is provided on a circumference of the upper rotating insertion cylinder; the gear and the tooth are connected and cooperate via a toothed belt, whereby rotation of the servo motor drives the upper rotating insertion cylinder and the lower rotating insertion cylinder to rotate; the controller is provided at an inner top part of the top cover; the controller is electrically connected to the servo motor;

wherein the machine further comprises a rotating dial; an insertion rod is provided on an upper end of the rotating dial, and the insertion rod and the insertion ports form an insertion fit.

2. The makeup brush and sponge cleaning machine of claim 1, wherein a circular hole cooperating with the upper rotating insertion cylinder is provided on an upper end of the top cover, and an outer cover is disposed within the circular hole.

3. The makeup brush and sponge cleaning machine of claim 1, wherein a plurality of upper connecting columns are provided below the insertion disk located on the upper rotating insertion cylinder; a plurality of lower connecting columns are provided above the insertion disk located on the lower rotating insertion cylinder; an upper end of each lower connecting column is inserted into a corresponding upper connecting column and is fixedly connected by a screw.

4. The makeup brush and sponge cleaning machine of claim 1, wherein a pressure plate is provided above the mounting base, the pressure plate is located above the bearing for limiting the bearing, and the pressure plate is fixedly connected to the mounting base by screws.

5. The makeup brush and sponge cleaning machine of claim 1, wherein a switch electrically connected to the controller is provided on one side of the top cover.

6. The makeup brush and sponge cleaning machine of claim 1, wherein a battery is provided on the mounting seat, and the battery is electrically connected to the controller.

7. The makeup brush and sponge cleaning machine of claim 1, wherein a base is detachably connected to a bottom of the housing, and counterweights are disposed inside the base directly below the left chamber and the right chamber.

8. The makeup brush and sponge cleaning machine of claim 1, wherein a transparent viewing window is provided on a side wall of the right chamber of the housing for observing a water level.

* * * * *